United States Patent
Brown et al.

(10) Patent No.: US 6,928,547 B2
(45) Date of Patent: *Aug. 9, 2005

(54) SYSTEM AND METHOD FOR AUTHENTICATING USERS IN A COMPUTER NETWORK

(75) Inventors: Timothy J. Brown, Tampa, FL (US); Gregory C. Jensen, Redmond, WA (US); Rodney Rivers, Arlington, VA (US); Dan Nelson, Tampa, FL (US)

(73) Assignee: Saflink Corporation, Bellevue, WA (US)

( * ) Notice: Subject to any disclaimer, the term of this patent is extended or adjusted under 35 U.S.C. 154(b) by 9 days.

This patent is subject to a terminal disclaimer.

(21) Appl. No.: 10/614,353

(22) Filed: Jul. 7, 2003

(65) Prior Publication Data

US 2004/0010724 A1 Jan. 15, 2004

Related U.S. Application Data

(63) Continuation of application No. 09/347,779, filed on Jul. 6, 1999, now Pat. No. 6,618,806.
(60) Provisional application No. 60/091,824, filed on Jul. 6, 1998.

(51) Int. Cl.[7] ................................................. H04L 9/00
(52) U.S. Cl. ....................... 713/186; 713/168; 713/172; 713/200; 713/201; 713/202; 380/255; 705/50; 705/66; 705/76
(58) Field of Search ........................ 713/186, 200–202, 713/168, 172

(56) References Cited

U.S. PATENT DOCUMENTS

| | | | |
|---|---|---|---|
| 4,596,898 A | 6/1986 | Pemmaraju | 380/45 |
| 4,827,518 A | 5/1989 | Feustel et al. | |

(Continued)

FOREIGN PATENT DOCUMENTS

| | | |
|---|---|---|
| EP | 0 426 595 A2 | 1/2002 |
| EP | 1 176 489 | 1/2002 |
| WO | WO 01/11845 A2 | 2/2001 |
| WO | WO 01/48674 | 7/2001 |
| WO | WO 02/056138 A2 | 7/2002 |
| WO | WO 02/077819 A1 | 10/2002 |

OTHER PUBLICATIONS

Anonymous, *Microsoft Windows NT Resource Kit*, 1985–1993, Microsoft Press, 34–49.

Gibbs, Mark, *VINES 5.5 receives long-awaited recognition for network security*, 1993, Network World, pp. 22 and 25.

(Continued)

*Primary Examiner*—Albert Decady
*Assistant Examiner*—Aravind K Moorthy
(74) *Attorney, Agent, or Firm*—Wood, Herron & Evans, L.L.P.

(57) ABSTRACT

A rule based biometric user authentication method and system in a computer network environment is provided. Multiple authentication rules can exist in the computer network. For example, there may be a default system-wide rule, and a rule associated with a particular user trying to log in. There may be other rules such as one associated with a remote computer from which the user is logging in, one associated with a group to which the user belongs, or one associated with a system resource to which the user requires access such as an application program or a database of confidential information. An order of precedence among the rules is then established which is used to authenticate the user.

24 Claims, 3 Drawing Sheets

U.S. PATENT DOCUMENTS

| | | | |
|---|---|---|---|
| 5,229,764 A | | 7/1993 | Matchett et al. |
| 5,272,754 A | | 12/1993 | Boerbert |
| 5,280,527 A | | 1/1994 | Gyllman et al. |
| 5,430,827 A | | 7/1995 | Rissanen |
| 5,491,796 A | | 2/1996 | Wanderer et al. ........... 709/224 |
| 5,534,855 A | | 7/1996 | Shockley et al. |
| 5,581,700 A | | 12/1996 | Witte |
| 5,613,012 A | | 3/1997 | Hoffman et al. |
| 5,682,478 A | | 10/1997 | Watson et al. |
| 5,719,950 A | | 2/1998 | Osten et al. |
| 5,848,231 A | | 12/1998 | Teitelbaum et al. |
| 5,877,483 A | * | 3/1999 | Bilich et al. ................ 235/382 |
| 5,931,948 A | | 8/1999 | Morisawa et al. |
| 6,016,479 A | | 1/2000 | Taricani, Jr. |
| 6,038,315 A | | 3/2000 | Strait et al. |
| 6,058,426 A | * | 5/2000 | Godwin et al. ............. 709/229 |
| 6,067,623 A | | 5/2000 | Blakley, III et al. |
| 6,070,141 A | * | 5/2000 | Houvener et al. ............. 705/1 |
| 6,081,893 A | * | 6/2000 | Grawrock et al. .......... 713/183 |
| 6,167,517 A | | 12/2000 | Gilchrist et al. |
| 6,182,076 B1 | | 1/2001 | Yu et al. |
| 6,256,737 B1 | | 7/2001 | Bianco et al. |
| 6,266,664 B1 | | 7/2001 | Russell-Falla et al. |
| 6,269,371 B1 | | 7/2001 | Ohnishi |
| 6,275,825 B1 | | 8/2001 | Kobayashi et al. |
| 6,317,544 B1 | | 11/2001 | Diehl et al. |
| 6,400,806 B1 | | 6/2002 | Uppaluru |
| 6,434,259 B1 | | 8/2002 | Hamid et al. |
| 6,618,806 B1 | * | 9/2003 | Brown et al. ................ 713/186 |
| 6,674,537 B2 | * | 1/2004 | Kadowaki ................... 358/1.15 |
| 6,736,313 B1 | * | 5/2004 | Dickson ...................... 235/380 |
| 2002/0116349 A1 | | 8/2002 | Batachia et al. |
| 2003/0163739 A1 | | 8/2003 | Armington et al. |
| 2004/0010698 A1 | | 1/2004 | Rolfe |

OTHER PUBLICATIONS

Backman, Dan, *Guarding the flank with RADIUS & TACACS=*, Feb. 1998, Network Computing, pp. 1–4.

Sullivan, Thomas, *Open enterprise networks demand the security enhancements in Windows 2000*, May 2000, Ent, p. 1.

Anderson et al, *NOSes enhance internet accessibility*, May, 2000, Network Computing, pp. 1–15.

Doherty, Sean, *Iridian Technologies' Private ID 2.0 let users' eyes secure their access*, Dec. 2001, Network Computing, pp. 1–3.

Fratto, Mike, *PremierAccess heads a pedestrian pack*, Sep., 2002, Network Computing, pp. 1–8.

Berlind, David, "Is that a biometric device in your pocket?", StrikeForce Technologies, Inc. Press Release of May 23, 2003; www.sftnj.com/pressreleases2.asp from Yahoo! Search of Jun. 9, 2004, 3 pages.

Laura Guevin, *Striking While The Iron Is Hot*, Technology Marketing Corporation (Apr. 29, 2003); downloaded Jul. 7, 2004 from www.biometritech.com/features/notebook042903.htm, 3 pages.

Berlind, David "Is that a biometric device in your pocket?", StrikeForce Technologies, Inc. Press Release of May 23, 2003; www.sftnj.com/pressreleases2.asp from Yahoo! Search of Jun. 9, 2004, 3 pages.

QT Worldtel Inc., *C.O.B.A.S Centralized Out–Of–Band Authentication System: Authentication Security for the 21st Century*, Southeast Europe Cybersecurity Conference, Sophia, Bulgaria, Sep. 8–9, 2003, 14 pages.

Kresbach, Karen, "Security: Firms Flirt with Out–of–band Authentication; Banks Weigh Whether this Cumbersome Technology is Worth the Bother for Consumers, Particularly for On–line Banking", *Bank Technology News*, Jun. 1, 2004, 5 pages.

Samar, V. et al., *Unified Login with Pluggable Authentication Modules (PAM)*, Open Software Foundation Request for Comments: 86.0, rfc86_0, (Oct. 1995), pp. 1–30.

The Open Group, *Preliminary Specification, "X/Open Single Sign–On Service (XSSO) Pluggable Authentication Modules"*, ISBN: 1–85912–144–6, Document No. P702, (Jun. 1997), pp. Cover–126.

Anonymous, *Entrust Technologies Teams with Schlumberger and American Biometric Company to Provide Enhanced Security for Today's Mobile Workforce*, Dec. 1998.

Anonymous, *NRI Introduces Finger–Image–Enabled User Authentication for Windows NT Operating System*, NRI Product Write–Up, Nov. 1996 (3 pages).

Anonymous, *Biometric Identification Inc. and I/O Software Inc. Collaborate to Integrate Fingerprint Verification Technology*, Dec. 1998.

Newton, Harry, *Newton's Telecom Dictionary*, 2002, CMP Books, 18th Updated and Expanded Edition, p. 57.

*Microsoft Computer Dictionary*, 2002, Microsoft Press, Fifth Edition, p. 427.

R. Gallery and T.I.P. Trew, *An Architecture for Face Classification*, 1992, pp. 1–5.

Cole, George, *Biometrics and its benefits*, Oct. 1996, Financial Times Information Limited, pp. 1–4.

Komando, Kim, *PC Security Now Just a Fingerprint Away*, Aug. 1998, Denver Post, pp. 1–2.

Anonymous, *Identicator Unveils Suite of Fingerprint Identification Products for the PC*, Nov. 1998, Business Wire, pp. 1–3.

Anonymous, *LogonUser*, 1997, Microsoft, pp. 1–3.

* cited by examiner

SYSTEM AND METHOD FOR AUTHENTICATING USERS IN A COMPUTER NETWORK

RELATED APPLICATIONS

This application is a continuation of application Ser. No. 09/347,779, filed Jul. 6, 1999, now U.S. Pat. No. 6,618,806 which is related to and claims priority from Provisional Application No. 60/091,824, filed Jul. 6, 1998. The disclosures of both said applications are incorporated herein by reference.

This application is related to patent application Ser. No. 09/285,028, filed Apr. 1, 1999, which claims priority from Provisional Application Ser. No. 60/080,319, filed Apr. 1, 1998, both of which are incorporated herein by reference.

FIELD OF THE INVENTION

The present invention relates to security systems and methods for controlling access to computers.

BACKGROUND INFORMATION

The WINDOWS NT operating system (or "WINDOWS NT") from Microsoft Corporation of Redmond, Wash. provides a set of windowed utilities that allows easy setup and administration of a security system. The WINDOWS NT operating system itself is secure and makes its security system available to all applications through a standard Win32 security API.

An important aspect of the WINDOWS NT security system is that it is user-centric. Each line of code that attempts to access a secure object (file, printer, pipe, service, etc.) must be associated with a particular user. A user must identify himself to WINDOWS NT using a user ID and a password, via a log-on function. Each security check is made against the user's identification.

As a result, it is not possible, for example, to write code that prevents an application (e.g., Microsoft EXCEL) that is running under WINDOWS NT from accessing an object. For instance, an object can be secured against access from user Joe running EXCEL, but if user Carla is allowed to access the object, she can do so using EXCEL or any other application. All Carla has to do is identify herself to WINDOWS NT using her password.

Thus the entire validity of the WINDOWS NT security system is based on accurate identification of the user. WINDOWS NT user authentication is based on user IDs and passwords. Once a password is compromised, a general collapse of the security system can occur. There is therefore a need for a capability that adds a second factor to password-based authentication mechanisms such as that of WINDOWS NT. Such a capability should also ensure robustness while improving end-user convenience.

Not only do passwords present a security risk, they are also costly to administer. To provide an acceptable level of security, it is not uncommon to require changing corporate users' passwords every 30 to 60 days. This is not only an annoyance to the user, it is a major resource drain on system administrators. Surveys have shown that over 50% of the calls received by internal corporate hotlines are password related. Adding to this the lost productivity of professional office workers trying to figure out what their correct current password is, or requesting to be reinstated on the network, leads to an estimated annual cost of maintaining passwords of as high as $300 per user.

Saflink Corporation, with funding from the U.S. Department of Defense, has developed a Human Authentication application program interface (API), or HA-API, which allows applications to work with multiple biometric technologies presently available today and to integrate with new technologies in the future without requiring changes to the applications. The HA-API specification provides a set of standard program names and functions that enable various biometric technologies to be implemented easily into application programs for network user identification and authentication. It is foreseen that HA-API will be used both by application/product developers who wish to integrate biometric technology into their applications as well as by biometric vendors who wish to adapt their technologies for use within open system application environments.

FIG. 1 is a block diagram illustrating the architecture of HA-API. HA-API provides two interfaces. The first interface is an application API 101 consisting of functions 103 to determine which biometric technology (finger image, voice, facial image, etc.) is available to the application 10 and a set of functions 105 to authenticate a user's identity via any of the available technologies. The HA-API authentication functions 105 hide the unique characteristic of each biometric from the application 10. The second interface is a Biometric Service Provider (BSP) Interface 111 which provides a common interface for biometric technology providers to "plug-in" their unique modules 150. BSP modules 150 contain the capture, extraction (converting biometric features into a digital representation called a Biometric Identifier Record), and matching capabilities of a biometric vendor.

The full text of the Human Authentication API has been published by the Biometric Consortium (available at biometrics.org).

SUMMARY OF THE INVENTION

The present invention provides a rule based biometric user authentication method and system in a computer network environment. Multiple authentication rules can exist in the computer network. For example, there may be a default system-wide rule, and a rule associated with a particular user trying to log in. There may be other rules such as one associated with a remote computer from which the user is logging in, one associated with a group to which the user belongs, or one associated with a system resource to which the user requires access such as an application program or a database of confidential information. An order of precedence among the rules are then established which is used to authenticate the user.

In operation, a user identification such as a password is received. If an authentication rule associated with the user exists, the system according to the present invention authenticates the user with a captured biometric information and a previously stored biometric information according to the authentication rule associated with the user. If not, the system authenticates the user with the captured biometric information and the previously stored biometric information according to a system default rule. In that embodiment, the user rule has a higher precedence than the system default rule.

DETAILED DESCRIPTION

Figure 1:
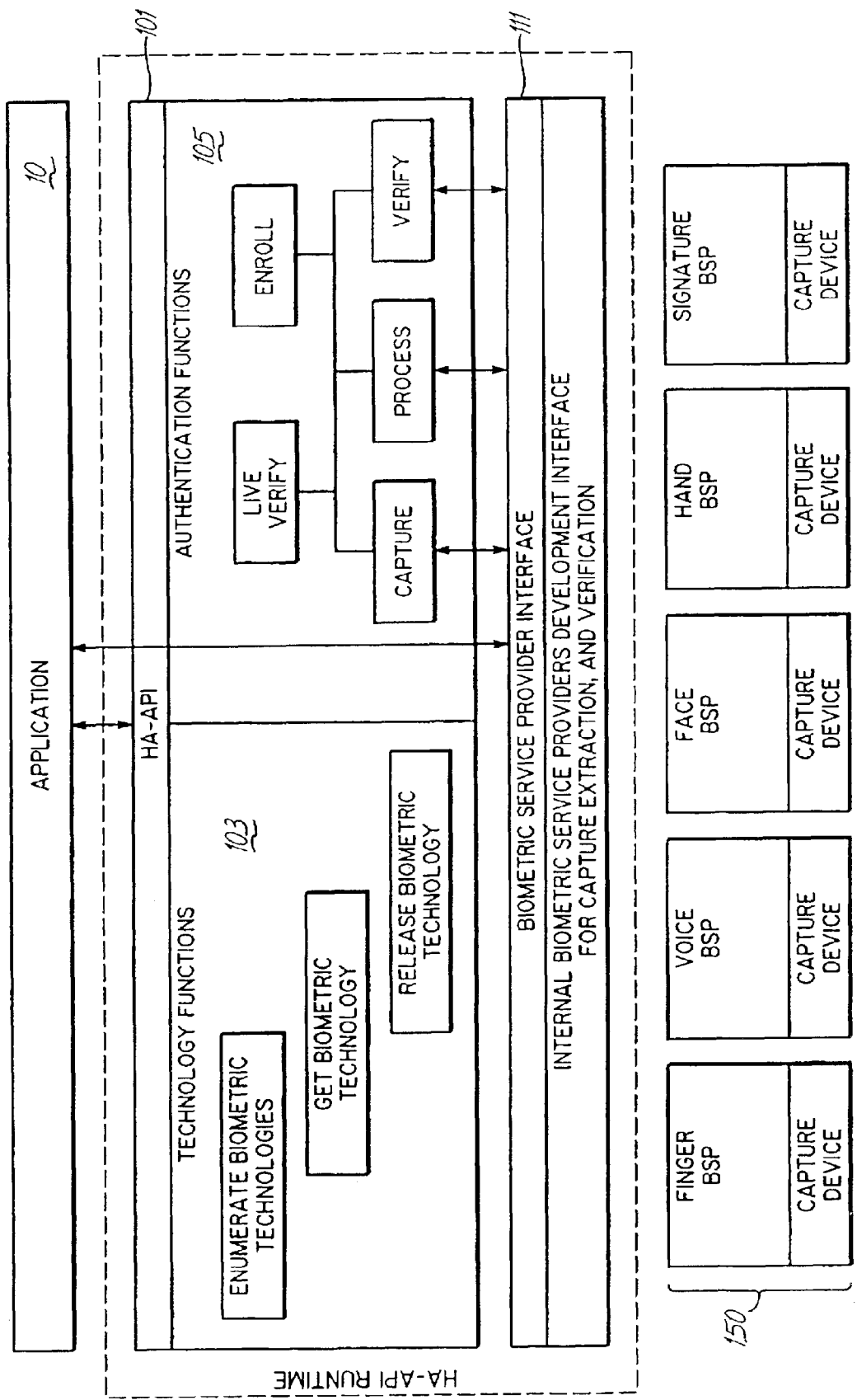
FIG. 1 is a block diagram of the architecture of the Human Authentication API (HA-API).
Figure 2:
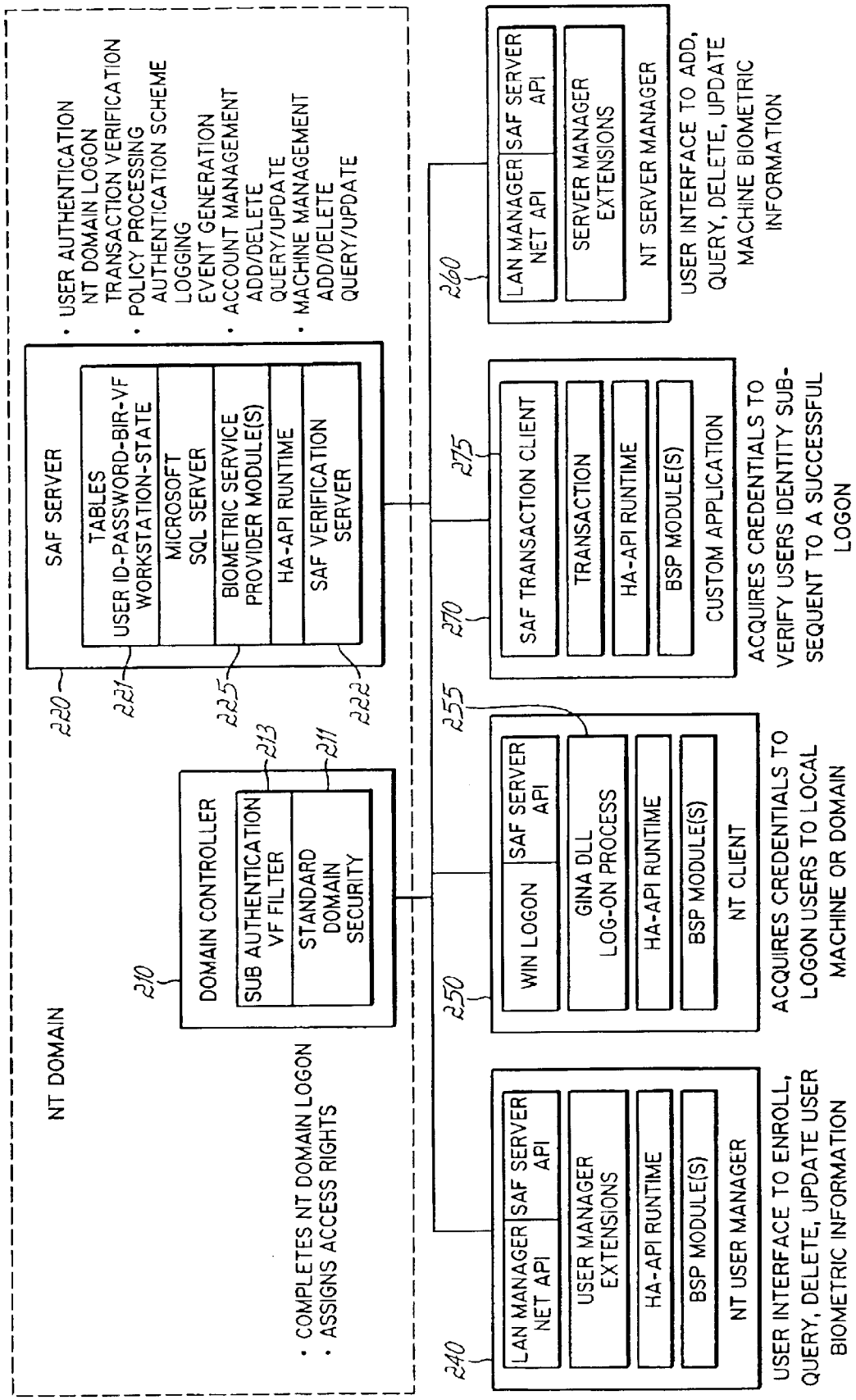
FIG. 2 is a block diagram of an exemplary system in accordance with the present invention.

FIG. 2 is a block diagram showing the various components in an exemplary system in accordance with the present invention. The exemplary embodiment described operates in conjunction with the WINDOWS NT operating system. Although a WINDOWS NT-based embodiment is described, the system of the present invention is applicable to a wide variety of operating systems.

An exemplary embodiment of a system in accordance with the present invention includes a plurality of software modules: a Graphical Identification and Authentication (GINA) DLL 255; SAF Server 220; SAF/NT VF Sub-authentication filter 213; extensions to WINDOWS NT User Manager 240 and Server Manager 260; and SAF Transaction Client 275. In addition, a modified WINDOWS 95/98 Network Provider may be included for WINDOWS 95/98 installations. These modules can be installed as an add-on or over-pack to the basic WINDOWS NT operating system. Once Microsoft's standard products, such as WINDOWS NT Client 250, WINDOWS NT Server, and SQL Server have been installed on a computer system, the aforementioned modules of the system of the present invention can be installed.

The GINA DLL 255 is the portion of the WINDOWS NT client 250 that challenges a user for their userID, domain, and password. As part of SAF/NT, the GINA DLL 255 is modified to include biometric identification in accordance with the present invention. The modified GINA DLL 255 preferably can be invoked with the same key sequence (e.g., CTRL+ALT+DEL) used to invoke the standard GINA DLL.

The modified GINA DLL 255 communicates with the SAF Server 220 (described below) to determine the state of the workstation, to query the registration status of a user, and to verify the user's BIR. The GINA DLL 255 also communicates with the NT security subsystem 211 to log a user onto a workstation or domain controller 210.

The modified GINA DLL 255 may also preferably provide a secure screen saver capability that locks a workstation's keyboard and hides information displayed on the video monitor during a user's absence from the workstation. Upon return, only the user's biometric is required to unlock a biometrically enabled workstation. If a password-only user is logged on to a biometrically enabled workstation, then the user's password will unlock the workstation. The screen saver can be invoked manually through a key sequence or via a configurable time-out value.

The SAF/NT Windows 95/98 Network Provider delivers the same functionality as the GINA DLL for domain log-ons from a WINDOWS 95/98 workstation. Since WINDOWS 95/98 does not support the same level of security for the client workstation as does WINDOWS NT, biometric authentication is supported for domain log-ons only.

The SAF Server 220 performs several functions. First, the SAF Server 220 responds to requests from the GINA DLL 255 to query the registration status of a user with a command to capture the appropriate biometric or password. A user can have multiple biometrics registered (fingerprint, voice print, facial shape, etc.), with one biometric designated as primary. The primary biometric for a user is the biometric the user would normally be challenged for if the workstation supports the capture device. If the workstation does not support the user's primary biometric (e.g., fingerprint) but does support a secondary biometric for which the user is registered (e.g., voice), the SAF Server 220 will command the GINA DLL 255 to capture the secondary biometric. As such, the SAF Server 220 controls the biometric capture procedure in accordance with the user's biometric status as well the biometric capabilities of the workstation by which the user seeks access.

Second, the SAF Server 220 maintains a database 221 of Biometric Identifier Records (BIRs) for a plurality of registered users. Each BIR contains biometric information for a user, preferably in accordance with the HA-API specification. Each registered BIR is associated in the database 221 with the corresponding user's userID and password. The SAF Server 220 verifies the BIR of a user attempting to log-on. Biometric matching is performed at the SAF Server 220. This provides the strongest identification and authentication possible since the server is typically physically secured. Since it is not practical in most networks to physically secure client workstations, other biometric log-in solutions that perform the biometric match at the remote client workstations are more vulnerable to a determined hacker attempting to circumvent the authentication process.

The SAF Server 220 supports multiple biometric types (e.g. fingerprint, voice print, facial shape, etc.) and multiple vendor technologies for each biometric type. A system administrator can set the primary biometric type and technology for each user. At authentication time, the primary biometric type and technology are compared with the client workstation's capabilities. If the workstation does not have the necessary resources to capture the primary biometric, the user can be optionally challenged for a password.

The SAF Server 220 also maintains the state of all workstations in the domain, logs failed verification requests in the NT security log and logs system administrator access in the NT security log.

In the exemplary embodiment, communications between client workstations and the SAF Server 220 is via Remote Procedure Calls (RPC) and is encrypted. A different encryption key is used for each session between a client and the server. If a strong encryption version of the WINDOWS NT operating system is used, 128-bit keys are generated.

Multiple SAF Servers can be configured using the replication services of SQL Server and Microsoft's Cluster Server (Wolfpack). The SAF Server(s) can be located on a domain controller, back-up domain controller, or on separate physical servers. This provides for scalability and resiliency of the SAF Server in large networks.

The SAF Server facilitates centralized management of user identification and authentication and also makes it easy to integrate additional biometric identification application modules in the future. All user information can be stored in a database, such as a Microsoft SQL Server database, using encryption, such as RSA's RC4 encryption.

Extensions to WINDOWS NT's standard User Manager and Server Manager provide enrollment and maintenance functions used by a systems administrator to register userIDs, passwords, BIRs, and workstation information into the SAF Server's database. The extensions also allow a systems administrator to delete a user, query a user's status, delete a workstation entry, and change the state of a workstation. The extended User Manager 240 and Server Manager 260 can communicate with the SAF Server 220 using NT RPC. All data is encrypted.

Figure 3:
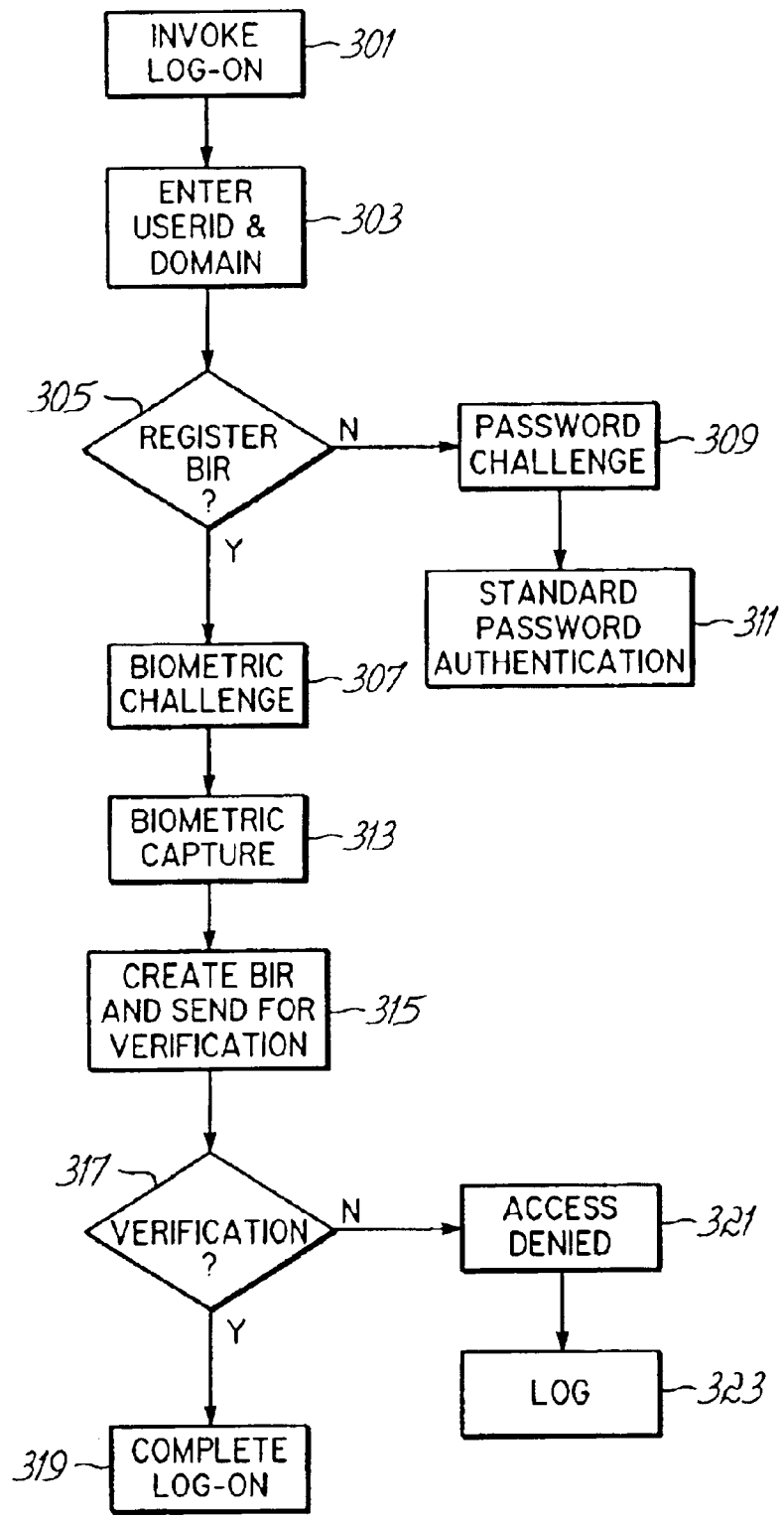
FIG. 3 is a flow chart depicting an exemplary log-on process with the system of the present invention.

FIG. 3 shows a flow chart of an exemplary log-on process in accordance with the present invention.

At step 301, a user invokes the log-on process, such as by pressing the standard WINDOWS NT key sequence Ctrl/Alt/Del. At step 303, the user enters his userID and domain. If it is determined at step 305 that the user's BIR is registered, the user is challenged at step 307 for his biometric features (e.g., finger image, voice, facial image, etc.) If it is determined at step 305 that there is no registered BIR for the user, the user is challenged at step 309 for his password. Log-on will then occur, at 311, using standard WINDOWS NT password authentication.

At step 307, the user is challenged to provide a biometric input for capture by the system. This procedure can be carried out with the assistance of a biometric capture wizard displayed on the computer. Once challenged for a biometric, the user follows the instructions of the biometric capture wizard. Each type of biometric requires the user to follow a different set of instructions such as placing a finger on a scanner for finger image, speaking a phrase into a microphone for voice recognition, or facing a camera for facial authentication. The biometric is captured at step 313.

At step 315, the modified GINA DLL creates a BIR from the captured biometric and sends the BIR with the userID to the SAF Server for verification. The SAF/NT Verification Server 222 retrieves the user's record and compares the BIR submitted by the user to the BIR stored in the database 221. The comparison of BIRs is carried out using a HA-API compliant Biometric Service Provider (BSP) module 225 for the given biometric. Such modules are available, for example, from Visionics (for face image), ITT (voice) and Cogent (fingerprint). At step 317, the SAF/NT Verification Server makes a yes/no decision and returns this decision to the user's workstation.

If the verification server 222 verifies that the user is authorized to log on, the server will retrieve the user's password from the database 221 and send the user's password back to the workstation where the log-on will be completed, at step 319, via the GINA DLL 255. The completion of the log-on procedure is transparent to the user. If the verification server decides that the user is not authorized, at step 321 the user will be denied access and an "access denied" message will be displayed on the screen. Additionally, at step 323, the failed verification will be logged, such as in the WINDOWS NT security log.

A SAF/NT Validity Flag Sub-authentication filter 213 is optionally installed on the domain controller 210. The filter 213 communicates with the SAF Server 220 to check the status of a user's validity flag whenever an authorization request for that user is received by the domain controller 210. Validity flags are used to determine whether users attempting to log-on were recently authenticated by the SAF Server 220 within some preselected time interval (e.g., 1–2 seconds) prior to being authenticated by the standard password security system 211. If a user attempting to log-on was not recently authenticated by the SAF Server 220, that indicates that the user wrongfully by-passed the SAF/NT biometric authentication system. The combination of the workstation state and the validity flag prevents a person from disabling the biometric capture hardware on a workstation in an attempt to bypass the biometric authentication process and use a password only. The validity flag contains a time stamp.

A SAF Transaction Client 275 allows a custom application 270 to verify a user's identity via the SAF Server 220, subsequent to a successful logon. The identification can be of the currently logged-on user or another user who is enrolled in the SAF database. A supervisory override on a transaction is an example of a situation in which another user would be identified.

At a time when "hacker contests" result in mainframe security breaches at the Pentagon and other government agencies, the need for a comprehensive data security plan has never been greater. Managing information security is now a major enterprise challenge, as applications evolve to run over a mix of public and private networks. To be effective, information security must adapt to business needs, enable business processes, and become an integral component of business systems.

As the world shifts from an industrial economy to one based on information, key new technologies led by the Internet are enabling a business revolution where people and businesses are interacting in new and exciting ways. The ability to make information accessible from anywhere in the world that has an Internet connection and a browser has been a catalyst for a whole new breed of business applications. Internet based enterprise network applications that provide a consistent view of a company and its services, enable better communication both inside the company and between the company and its partners, suppliers, and customers. They provide a strategic competitive advantage on both the top and bottom lines.

Security is a principle enabler of the information-based economy, allowing for the creation of the virtual corporation and the migration of business applications to Internet based enterprise network applications. Today, the distinction between the "good secure" internal network and the "bad insecure" external network is no longer valid. Companies must not only protect the perimeter and interior of their network, but also the data and applications used to run the business in a global information anytime, anywhere environment.

Internet-based enterprise network applications require security solutions for implementing business policies. Each organization has to establish and enforce policies covering when and how users are identified before accessing proprietary information. At Saflink Corporation, an assignee of the present application, it has developed a software called SAFsite that delivers a next-generation identification and authentication (I&A) solution which lets organizations enforce their business policies securely. In developing the SAFsite product, Saflink began by designing a base architecture for an enterprise network solution. The resulting multi-biometric I&A framework is network-centric, and features a central SAF Server that may be shared by all Web applications. This facilitates centralized management of user identification and authentication and also makes it easy to integrate additional application modules as time goes on. SAFsite is HA-API compliant (a recognized industry standard) supporting multiple biometrics, affording users maximum flexibility and choice.

SAFsite provides biometric-based identification and authentication of Web site administrators and end-users with access privileges to protected Web information. It is built on the proven SAF architecture, supporting multiple biometrics, and is integrated with the other members of the SAF family.

SAFsite delivers the most positive form of user identification and authentication. A comprehensive data security plan includes a number of elements—encryption, access control hierarchies, security policies, physical security of data servers, etc. But the cornerstone of any sound enterprise security plan is user I&A. Without uncompromising I&A, other elements of the security solution are jeopardized. And, nowhere in an enterprise network is user identity more in question than on the Internet.

SAFsite is a software development kit which allows multi-biometric based I&A to be integrated into enterprise network applications designed for the Internet built with leading rapid application development tools such as Everware Development Corporation's Tango, Allaire's Cold Fusion, NetObject's Fusion, Microsoft's Visual InterDev, HAHTSite, and NetDynamic's Enterprise Network Application Platform.

Each user whether a Web site administrator, employee, or customer attempting to access protected, proprietary information is biometrically authenticated by SAFsite prior to gaining access permission. When a user attempts to access a protected Web page, SAFsite challenges the user for their userID. For a user who belongs to a group, the userID may include a primary key that identifies the group and a secondary key that identifies the user within that group. The keys may be typed in by the user, or automatically generated by, for example, the swipe of an employee ID card through a card reader. Based on a set of enterprise security policies SAFsite then challenges the user for the appropriate biometric credentials, such as finger-image, voice print, or facial image. The user's biometric is captured, individual characteristics are extracted from the biometric, and a digital representation of the characteristics are sent to the SAF Server 220 for authentication. SAFsite supports both Microsoft's Internet Explorer and Netscape Communicator browsers.

The SAF Server 220 maintains a database 221 of all users and their biometric credentials. Biometric matching is performed at the trusted SAF Server 220. This provides the strongest identification and authentication possible since the server is typically physically secured. Since it is not practical in most networks to physically secure client workstations, other biometric log-in solutions that perform the biometric match at the remote client workstation are more vulnerable to a determined hacker attempting to circumvent the authentication process.

All user information is stored in the Microsoft SQL Server database using RSA's RC4 encryption. In its current implementation, SAFsite requires the customer to purchase one of the versions of Microsoft SQL Server (workstation or server) or the Microsoft Back Office suite. The communications between the browser's biometric ActiveX control or plug-in and the SAF Server is via Secure Sockets Layer. Communication between a Web application and the SAF Server is via Remote Procedure Calls (RPC) and is encrypted. If a strong encryption version of the Windows NT operating system is used, 128 bit keys are generated.

Scalability and resiliency of the SAF Server in large networks is provided for through the ability to configure multiple SAF Servers using SQL Server replication services and Microsoft's Cluster Server (Wolfpack). The SAF Server(s) can be located physically on a Web server or on separate physical servers.

As an overview of the SAFsite architecture, it provides a foundation for user-based, multiple biometric identity authentication for Web based enterprise network applications. It can be used as is, or extended to provide a powerful, yet flexible password replacement or augmentation mechanism.

SAFsite includes three main components: browser biometric extensions, the authentication client library, and the SAF Server. The first component, browser biometric extensions, includes a Microsoft Internet Explorer active-X control and a Navigator Communicator "plug-in" that capture an individual's user-ID and biometric information, such as finger print facial shape, or voice print. The browser biometric extensions provide biometric capture for both enrollment and authentication. They interface with a HA-API Biometric Service Provider module (see HA-API specification for details).

The first component, browser biometric extensions, communicates with the Web application via Secure Sockets Layer and all data is encrypted. The Web application also interfaces to the authentication client library. The authentication client library provides an interface for communicating to the SAF Server. All data buffering and session management between the browser extensions and the authentication client library is the responsibility of the Web application.

The third component is the SAF Server that accepts requests from multiple clients. The SAF Server communicates directly with an encrypted database that maintains user information. This information includes user name, biometric records for each user, authentication rule, and additional application specific data such as encrypted password or key for another data table. Primary and secondary keys are maintained for those users who belong to a group. This would allow for the authentication server to be extended to support 1 to few searching, based on the secondary key. That is, the biometric record of the user is compared against those of the group members. The components of the server can exist on a single machine, or can reside on multiple machines, taking advantage of distributed object architectures such as DCOM or CORBA, which would handle load balancing and referral services for the server. Communication between the client and server is via Secure RPC, using the strongest encryption available on the data being sent.

According to a preferred embodiment of the present invention, SAF Server authentication employs a rule-based, multiple biometric solution. Rule-based authentication allows for a powerful, yet extremely flexible mechanism for identifying users. It also allows for the combinations of multiple biometrics to be mixed to offer strong authentication. Rules can be as simple as logging on with a single biometric, or can be as complex as specifying multiple authentication paths, depending on time-of-day, security level, applicable biometric success, and reasonable false accept/reject levels. A hierarchy of rules precedence is also maintained.

Rule based biometric authentication is the notion of authenticating a user based on a variety of rules which specify different actions to take depending on the parameters specified by the rule. Parameters may include time of day, security level, success/failure of a specific biometric, or false accept/reject levels. Additional parameters can be specified by an application to suit particular authentication needs. Examples of a rule may be "use a fingerprint or facial biometric information for authentication during business hours", "use a combination of fingerprint and facial biometric information during non-business hours and authenticate the user only when the confidence level of the match is above 90%", or "authenticate a user using any biometric information with a confidence level of at least 95%".

Multiple rules can exist inside the entire client/server world. Therefore an order of precedence is defined. By default, a system wide rule is defined. This rule has the lowest of precedence and may be as simple as a single biometric authentication such as "use a fingerprint biometric information for authentication". If secondary keys are used in the authentication database, a primary key can have a rule associated with it. For example, for access to a joint account in an Internet banking application software, a user may have a primary key associated with the account such as the main account number and a secondary key associated with the user himself such as his own sub-account number or a Social Security number. This allows for group based rules. This group-based rule has precedence over the system default rule. A particular user (identified by a unique primary and secondary key combination) can have an associated authentication rule. This authentication rule has precedence over the group and system default rules. Additional rules to handle workstation (if available) and object can be added to extend the architecture. Their precedence would be workstation over user, object over workstation. As persons of ordinary skill in the art can appreciate, an object is anything that needs to be secured against unauthorized access. For example, an object can an application program such as an Internet banking program or any computer resource such as a storage device that stores confidential data. As an exemplary case, the following provides an order of precedence:

1. Use the rule associated with an object if available else,
2. Use the rule associated with a workstation from which a user is trying to log on if available else,
3. Use the rule associated with the user else,
4. If primary and secondary keys are used, Use the rule for a primary key (group) if available else,
5. Use the system default rule.

The third component of SAFsite, authentication client library, provides the functionality needed to create, maintain and authenticate against a secured, multiple biometric user database. This functionality includes authentication as well as typical database requests: add, delete, update and query. To support rule-based authentication, the client library also provides functions for creating and maintaining rules.

The following exemplary functions are included in the library:

Authenticate( )—The authenticate function provides a single function call verifying a users identity. The server performs authentication based upon the stored rule. Additionally, an overriding rule can be specified by the user, which would allow for object based authentication. The function is wholly responsible for prompting the user for all of the required interaction for capturing the biometrics specified in the rule. Authenticate can also return the user data if requested. This function will perform a 1 to few match if a primary and secondary key exists in the database and the authenticate function is only called with a primary key (thus enabling group searching).

Add( )—The add function inserts a user into the Authentication database. A primary key, a secondary key (if available) biometric data and user specific data can be added.

Delete( )—The delete function removes a record from the Authentication database based upon primary (and secondary if available) key.

Update( )—The update function refreshes the data found in the Authentication database for a particular primary (and secondary if available) key.

Query( )—The query function retrieves the current data for a particular primary (and secondary if available) key. The query function can be used for retrieving the authentication rule as well. Any Web application that requires biometric authentication can take advantage of the authentication client library.

The SAF Server 220 provides the actual mechanism for storing biometric data and authenticating against that data. It accepts requests from multiple clients who desire authentication. Upon receiving a request for authentication, the server performs the particular match based upon a specified biometric. The specification of this biometric is dictated by the client Authenticate( ) function as it processes the authentication rule. If there are any factors to be used for matching (i.e. false accept/reject rates, security level, etc), the server takes them into account before returning a TRUE/FALSE answer to the client. The SAF Server supports primary and secondary keys, and can be configured to handle either. Using secondary keys can allow for the creation of groups and can facilitate group wide authentication searches and group wide rules.

The SAF Server 220 also accepts requests for database maintenance. These requests are issued by a client and include Add, Delete, Update and Query.

In its simplest form, the SAF Server 220 is a single server containing the code responsible for authenticating, as well as database maintenance. The database also resides on this machine (See FIG. 2). Since the SAF Server supports distributed objects, the pieces of the server could lie on multiple machines, thereby distributing the workload and allowing for higher performance, scalability and load balancing. In this scheme, the database can also reside on a separate machine. There are multiple methods for accomplishing this task. First each client can have specific knowledge of the location of each piece of the server and its appropriate task. The client is responsible for routing the different requests to the appropriate servers. In distributed object architectures, like DCOM, this routing is handled for the client, requiring no additional code. Unfortunately, while distributed, this method doesn't offer much in the way of load balancing. A second approach relies upon a referral object that initially accepts all of the requests from the client. This referral object can maintain information about server load, network topology between client and servers, and statistics about past demands of a given user. Given this information, when the client connects to the referral server, it is directed to most appropriate server to accomplish the requested tasks. The SAF Server can be configured to support all of these architectures.

Depending on application requirements, the Authentication Server can be extended to include additional information. For example, this information may include workstation information (authentication rule for the workstation, workstation enabled or disabled, etc.).

The foregoing specific embodiments represent just some of the ways of practicing the present invention. Many other embodiments are possible within the spirit of the invention. For example, although many aspects of the invention were described in the Internet environment, they may be operated in any computer network environment. Accordingly, the scope of the invention is not limited to the foregoing specification, but instead is given by the appended claims along with their full range of equivalents

What is claimed is:

1. A method of controlling access in a computer network environment comprising the steps of:
   (a) receiving a user identification of a user from a card reader which obtains the user identification from an ID card containing same;
   (b) determining whether there exists an authentication rule associated with the user based on the user identification received from the card reader;
   (c) prompting the user to provide biometric information according to the authentication rule associated with the user if it is determined that the authentication rule associated with the user exists;
   (d) prompting the user to provide biometric information according to a system default authentication rule if it is determined that the authentication rule associated with the user does not exist;

(e) capturing the biometric information;

(f) retrieving a stored biometric information associated with the user identification;

(g) comparing the captured biometric information with the retrieved biometric information; and (h) completing a log-on procedure if the captured biometric information corresponds to the retrieved biometric information.

2. The method of claim 1, prior to step (b), further comprising the steps of:

determining whether there exists an authentication rule associated with a remote computer from which the user is logging on;

prompting the user to provide biometric information according to the authentication rule associated with the remote computer if it is determined that the authentication rule associated with the remote computer exists.

3. The method of claim 1, prior to step (b), further comprising the steps of:

determining whether there exists an authentication rule associated with an object to which the user is being authenticated for access;

prompting the user to provide biometric information according to the authentication rule associated with the object if it is determined that the authentication rule associated with the object exists.

4. The method of claim 1, after step (c) and prior to step (d), further comprising the steps of:

determining whether there exists an authentication rule associated with a group to which the user belongs:

prompting the user to provide biometric information according to the authentication rule associated with the group if it is determined that the authentication rule associated with the group exists;

wherein step (d) includes prompting the user to provide biometric information according to the system default authentication rule associated if it is determined that both the authentication rule associated with the user and the authentication rule associated with the group do not exist.

5. The method of claim 1, further comprising the steps of:

determining whether there exists an authentication rule associated with an object to which the user is being authenticated for access;

requesting the user to provide biometric information according to the authentication rule associated with the object if it is determined that the authentication rule associated with the object exists;

determining whether there exists an authentication rule associated with a remote computer from which the user is logging on if the authentication rule associated with the object to which the user is being authenticated for access does not exist;

requesting the user to provide biometric information according to the authentication rule associated with the remote computer if it is determined that the authentication rule associated with the remote computer exists;

wherein step (b) includes determining whether there exists an authentication rule associated with the user if the authentication rule associated with the remote computer does not exist;

determining whether there exists an authentication rule associated with a group to which the user belongs if it is determined that the authentication rule associated with the user does not exist;

requesting the user to provide biometric information according to the authentication rule associated with the group if it is determined that the authentication rule associated with the group exists;

wherein step (d) includes prompting the user to provide biometric information according to the system default authentication rule if it is determined that both the authentication rule associated with the user and the authentication rule associated with the group do not exist.

6. The method of claim 1, wherein the biometric information includes information relating to one or more of a finger, hand, face, voice and signature of the user.

7. The method of claim 1, wherein the rule includes a parameter that specifies which type of biometric information reading devices is allowable for authentication.

8. The method of claim 1, wherein the rule includes a parameter that specifies the confidence level of a match between the captured biometric information and the retrieved biometric information.

9. The method of claim 1 further comprising interacting an ID card containing the user identification with the card reader whereby the card reader obtains the user identification.

10. The method of claim 9 wherein the ID card is interacted with the card reader by swiping the ID card through the card reader.

11. A method of controlling access in a computer network environment comprising the steps of:

(a) receiving a user identification of a user from a card reader which obtains the user identification from an ID card containing same;

(b) determining whether there exists an authentication rule associated with the user based on the user identification received from the card reader;

(c) authenticating the user with a captured biometric information and a previously stored biometric information according to the authentication rule associated with the user if it is determined that the authentication rule associated with the user exists; and (d) authenticating the user with a captured biometric information and a previously stored biometric information according to a system default authentication rule if it is determined that the authentication rule associated with the user does not exist.

12. The method of claim 11, prior to step (b), further comprising the steps of:

determining whether there exists an authentication rule associated with a remote computer from which the user is logging on;

authenticating the user with the captured biometric information and the previously stored biometric information according to the authentication rule associated with the remote computer if it is determined that the authentication rule associated with the remote computer exists.

13. The method of claim 11 further comprising interacting an ID card containing the user identification with the card reader whereby the card reader obtains the user identification.

14. The method of claim 13 wherein the ID card is interacted with the card reader by swiping the ID card through the card reader.

15. A method of controlling access in a computer network environment comprising the steps of:

(a) receiving first and second user identification of a user from a card reader which obtains the user identifications from an ID card containing same, the first user identification identifying the user and the second user identification identifying a group to which the user belongs;

(b) determining whether there exists an authentication rule associated with the user based on the first user identification received from the card reader;

(c) if it is determined that the authentication rule associated with the user exists, prompting the user to provide biometric information according to the authentication rule associated with the user and proceeding to step (e), and if is determined that the authentication rule associated with the user does not exist, determining whether there exists an authentication rule associated with a group to which the user belongs based on the second user identification received from the card reader;

(d) if it is determined that the authentication rule associated with the group to which the user belongs exists, prompting the user to provide biometric information according to the authentication rule associated with the group and proceeding to step (e), and if it is determined that the authentication rule associated with the group also does not exist, prompting the user to provide biometric information according to a system default authentication rule and proceeding to step (e);

(e) capturing the biometric information;

(f) retrieving a stored biometric information associated with the applicable authentication rule;

(g) comparing the captured biometric information with the retrieved biometric information; and (h) completing a log-on procedure if the captured biometric information corresponds to the retrieved biometric information.

16. A method of controlling access in a computer network environment comprising the steps of:

(a) receiving first and second user identification of a user from a card reader which obtains the user identifications from an ID card containing same, the first user identification identifying the user and the second user identification identifying a group to which the user belongs;

(b) determining whether there exists an authentication rule associated with the user based on the first user identification received from the card reader and if so, authenticating the user with a captured biometric information and previously stored biometric information according to the authentication rule associated with the user;

(c) if is determined that the authentication rule associated with the user does not exist determining whether there exists an authentication rule associated with a group to which the user belongs based on the second user identification received from the card reader, and if so authenticating the user with a captured biometric information and previously stored biometric information according to the authentication rule associated with the group;

(d) if it is also determined that the authentication rule associated with the group does not exist, authenticating the user with a captured biometric information and previously stored biometric information according to the authentication rule associated with a system default authentication rule.

17. A method of controlling access in a computer network environment comprising the steps of:

(a) receiving a user identification of a user from one of (i) a keyboard into which the user identification is typed, and (ii) a card reader which obtains the user identification from an ID card containing same;

(b) determining whether there exists an authentication rule associated with the user based on the user identification received from the keyboard or the card reader;

(c) prompting the user to provide biometric information according to the authentication rule associated with the user if it is determined that the authentication rule associated with the user exists;

(d) prompting the user to provide biometric information according to a system default authentication rule if it is determined that the authentication rule associated with the user does not exist;

(e) capturing the biometric information;

(f) retrieving a stored biometric information associated with the user identification;

(g) comparing the captured biometric information with the retrieved biometric information; and (h) completing a log-on procedure if the captured biometric information corresponds to the retrieved biometric information.

18. The method of claim 16 further comprising one of (i) typing in the user identification through the keyboard and (ii) interacting an ID card containing the user identification with the card reader whereby the card reader obtains the user identification.

19. A method of controlling access in a computer network environment comprising the steps of:

(a) receiving a user identification of a user from one of (i) a keyboard into which the user identification is typed, and (ii) a card reader which obtains the user identification from an ID card containing same;

(b) determining whether there exists an authentication rule associated with the user based on the user identification received from the keyboard or the card reader;

(c) authenticating the user with a captured biometric information and a previously stored biometric information according to the authentication rule associated with the user if it is determined that the authentication rule associated with the user exists; and (d) authenticating the user with a captured biometric information and a previously stored biometric information according to a system default authentication rule if it is determined that the authentication rule associated with the user does not exist.

20. The method of claim 19 further comprising one of (i) typing in the user identification through the keyboard and (ii) interacting an ID card containing the user identification with the card reader whereby the card reader obtains the user identification.

21. A method of controlling access in a computer network environment comprising the steps of:

(a) automatically generating a user identification of a user;

(b) determining whether there exists an authentication rule associated with the user based on the automatically generated user identification;

(c) prompting the user to provide biometric information according to the authentication rule associated with the user if it is determined that the authentication rule associated with the user exists;

(d) prompting the user to provide biometric information according to a system default authentication rule if it is determined that the authentication rule associated with the user does not exist;

(e) capturing the biometric information;

(f) retrieving a stored biometric information associated with the user identification;

(g) comparing the captured biometric information with the retrieved biometric information; and (h) completing a log-on procedure if the captured biometric information corresponds to the retrieved biometric information.

22. The method of claim 21 further comprising one of (i) typing in the user identification through the keyboard and (ii) interacting an ID card containing the user identification with the card reader whereby the card reader obtains the user identification.

23. A method of controlling access in a computer network environment comprising the steps of:

(a) automatically generating a user identification of a user;

(b) determining whether there exists an authentication rule associated with the user based on the automatically generated user identification;

(c) authenticating the user with a captured biometric information and a previously stored biometric information according to the authentication rule associated with the user if it is determined that the authentication rule associated with the user exists; and (d) authenticating the user with a captured biometric information and a previously stored biometric information according to a system default authentication rule if it is determined that the authentication rule associated with the user does not exists.

24. A method of controlling access in a computer network environment comprising the steps of:

(a) receiving a user identification of a user from one of (i) a keyboard into which the user identification is typed, and (ii) a card reader which obtains the user identification from an ID card containing same;

(b) determining whether there exists an authentication rule associated with the user based on whether the user identification is received from the keyboard or the card reader;

(c) prompting the user to provide biometric information according to the authentication rule associated with the user if it is determined that the authentication rule associated with the user exists;

(d) prompting the user to provide biometric information according to a system default authentication rule if it is determined that the authentication rule associated with the user does not exist;

(e) capturing the biometric information;

(f) retrieving a stored biometric information associated with the user identification;

(g) comparing the captured biometric information with the retrieved biometric information; and (h) completing a log-on procedure if the captured biometric information corresponds to the retrieved biometric information.

* * * * *